United States Patent [19]
Tansini

[11] Patent Number: 5,205,209
[45] Date of Patent: Apr. 27, 1993

[54] DEVICE APPLIABLE TO AN APPARATUS FOR MANUFACTURING "RAVIOLI" IN ORDER TO OBTAIN "TORTELLINI"

[75] Inventor: Luigi Tansini, S. Colombano al Lambro, Italy

[73] Assignee: Off. Mecc. Giacomo Toresani S.p.A., Milan, Italy

[21] Appl. No.: 878,935

[22] Filed: May 5, 1992

[30] Foreign Application Priority Data

May 10, 1991 [IT] Italy .................. MI91 A 001283

[51] Int. Cl.$^5$ .................. A21C 9/00; A21C 9/08; A21C 11/08; A23P 1/00
[52] U.S. Cl. .................. 99/450.6; 99/450.7
[58] Field of Search .................. 99/450.1, 450.2, 450.6, 99/450.7, 450.8, 353, 355, 494; 425/112, 115, 122, 448, 511, 512, 515, 518

[56] References Cited

U.S. PATENT DOCUMENTS

| 1,844,142 | 2/1932 | Barili | 99/450.2 |
|---|---|---|---|
| 2,001,792 | 5/1935 | Lombi | 99/450.2 |
| 2,227,728 | 1/1941 | Lombi | 99/450.2 |
| 2,437,202 | 3/1948 | Marino | 99/450.2 |
| 2,774,313 | 12/1956 | Lombi | 99/450.2 |
| 2,905,105 | 9/1959 | Lombi | 99/450.6 |
| 3,373,702 | 3/1968 | Quilici et al. | 99/450.5 |
| 3,605,641 | 9/1971 | Shuster | 99/450.7 |
| 3,611,950 | 10/1971 | Battaglia et al. | 99/450.7 |
| 4,160,634 | 7/1979 | Huang | 425/112 |
| 4,848,218 | 7/1989 | Battaglia | 425/115 |

Primary Examiner—Timothy F. Simone
Attorney, Agent, or Firm—Panitch Schwarze Jacobs & Nadel

[57] ABSTRACT

It is described an apparatus (4) for manufacturing "ravioli", comprising a device (2) for producing "ravioli" which are formed by the stuffing which comes from a feeding conduit (16) and by a sheet of pastry (10) which contains said stuffing and is fed by a proper guide (30), with the feature that said apparatus (4) for manufacturing "ravioli" is prepared to replace said device (2) with a device (34) to obtain "tortellini" having a shape as if they were hand-made. This device (34) comprises means (A) for forming "tortellini", means (B) for ejecting them and means (6) for blocking the device itself on the apparatus in such a position that said device (34), upon being applied to the machine, results to be central with respect to both the conduit (16) which feeds the stuffing and the sheet of pastry (10), with the conduit (16) being a part of the apparatus (4) for manufacturing "ravioli".

8 Claims, 6 Drawing Sheets

DEVICE APPLIABLE TO AN APPARATUS FOR MANUFACTURING "RAVIOLI" IN ORDER TO OBTAIN "TORTELLINI"

BACKGROUND OF THE INVENTION

1. Field of the Invention

The present invention relates to a device appliable to an apparatus for manufacturing "ravioli" in order to obtain "tortellini", by simply replacing the device for manufacturing "ravioli" with said device for manufacturing "tortellini", the latter having means for the blocking thereof on the apparatus in such a position that it results to be central with respect to both the feeding direction of the stuffing and the sheet of pastry.

2. Description of the Prior Art

Apparatuses are on sale which manufacture only "tortellini" and apparatuses which manufacture only "ravioli". It is clear that when both the products have to be manufactured, the user is obliged to buy both the apparatuses with consequent very high cost and greater waste of room.

SUMMARY OF THE INVENTION

The object of the present invention is to limit costs and encumbrances. Such an object is attained in particular by replacing the device for manufacturing "ravioli" with the device for manufacturing "tortellini" every time the need occurs to pass from obtaining "ravioli" to producing "tortellini" and vice-versa, without the addition of any supplementary device to the basic apparatus for manufacturing "ravioli".

BRIEF DESCRIPTION OF THE DRAWINGS

The characteristics as well as the advantages of the present invention will be clear from the following detailed description of a preferred embodiment thereof, made with reference to the attached drawings in which.

DESCRIPTION OF THE PREFERRED EMBODIMENT

Figure 1:
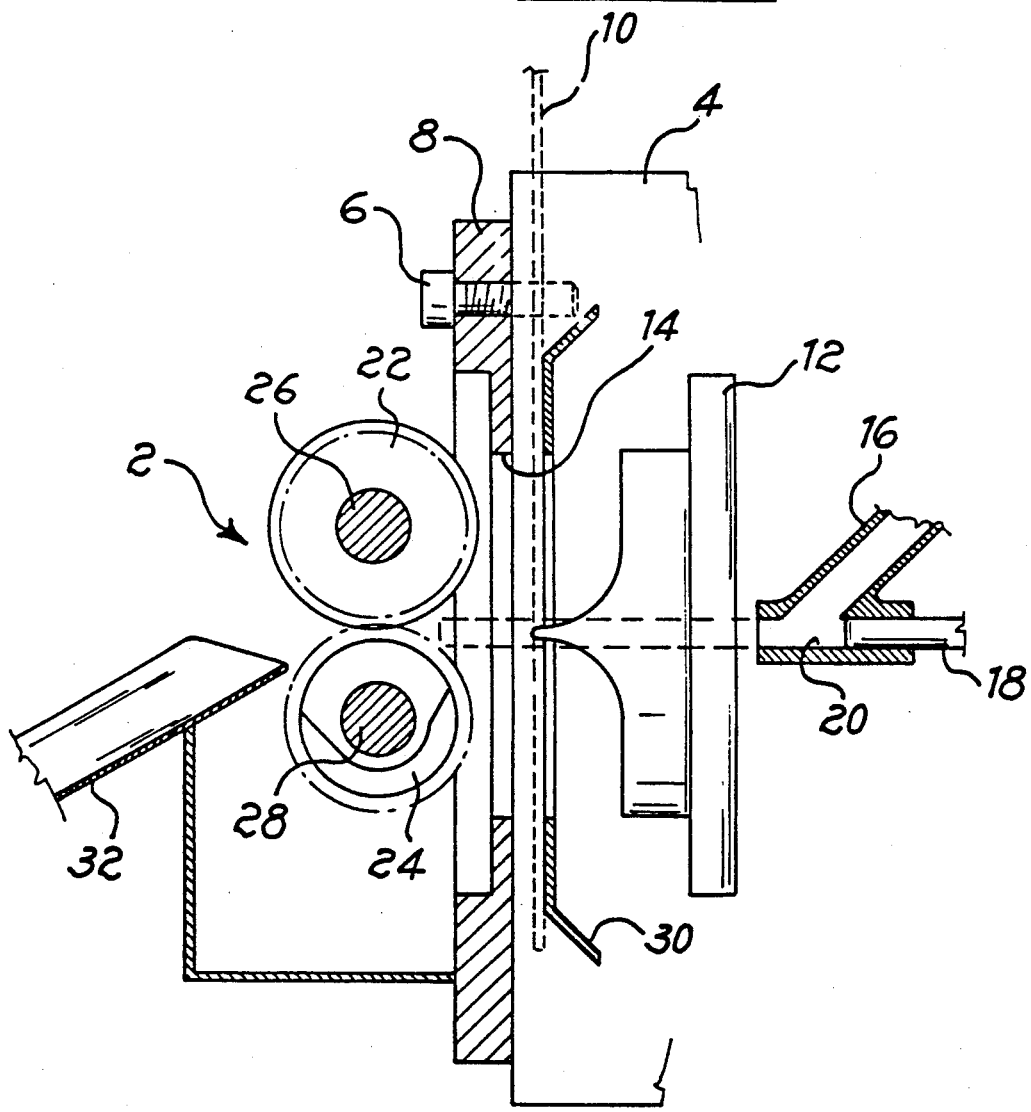
FIG. 1 is a partial sectional view of a known apparatus for manufacturing "ravioli"

Referring to FIG. 1, there is shown a device 2 for producing "ravioli" which is fixed to an apparatus 4 for manufacturing "ravioli" by means of bolts among which only one is shown, referenced by 6. Said device 2 essentially consists of a matrix 8 of a die for shearing a sheet of pastry 10, and comprises, besides the matrix 8, a punch 12. The matrix 8 has, in a medium zone thereof, an opening 14 which allows to insert inside the device 2 the pastry 10 containing the stuffing, which is fed through a conduit 16 and pushed by a piston 18 sliding inside the conduit 20, such that the batter formed by the stuffing wrapped by the sheet of pastry passes through a die 22 and a counter-die 24 keyed respectively on shafts 26 and 28.

It should be noticed that the sheet of pastry 10 slides along a guide 30 which is a part of the device 2, while the conduit 16 for feeding the stuffing is in a fixed position. The "raviolo" is formed by the passing of the batter through the properly shaped die 22 and counter-die 24, thus escaping out of them to fall on a suitably inclined chute 32, to be discharged in a collecting station not shown in the drawing.

Figure 2:
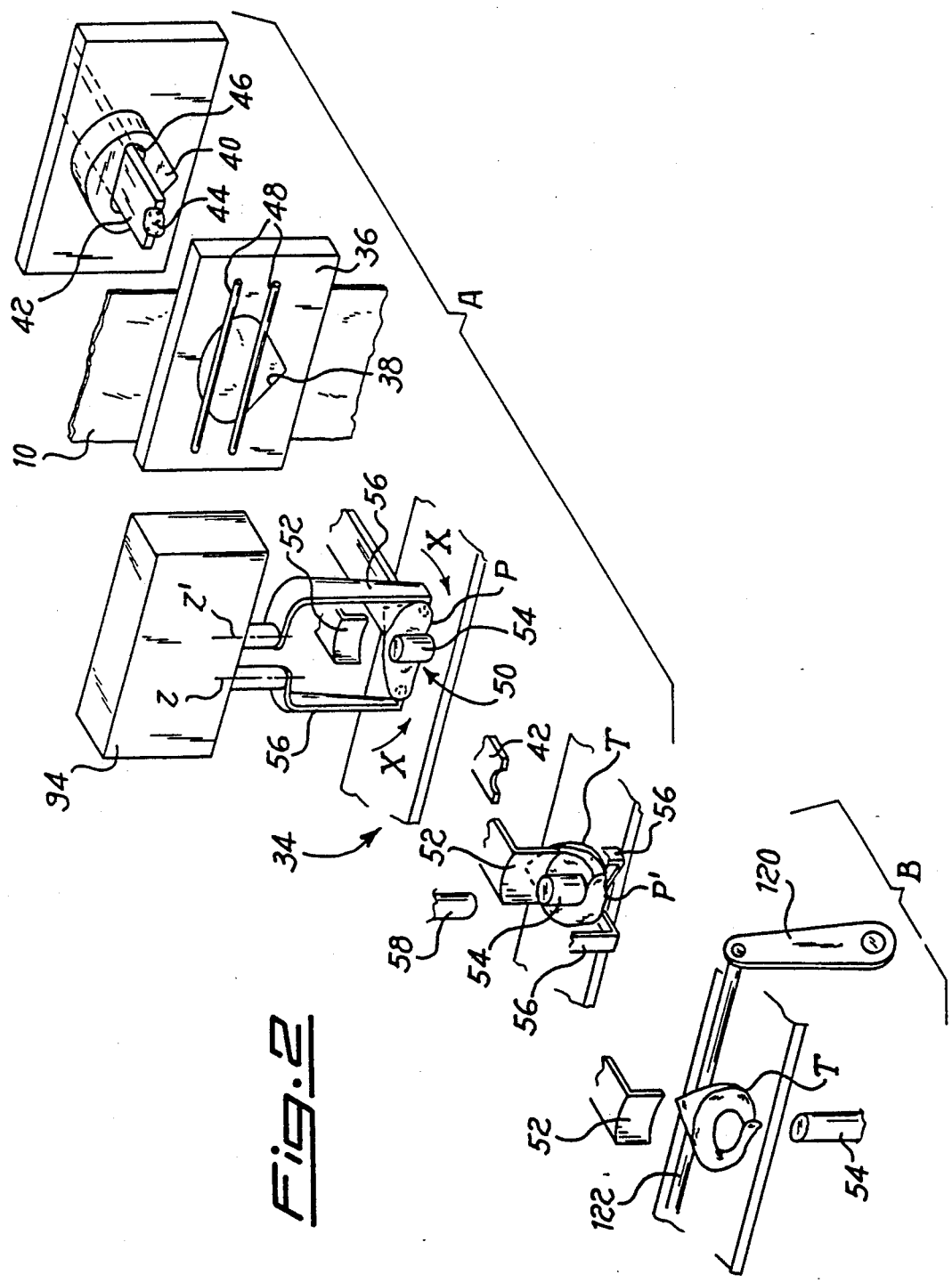
FIG. 2 is a perspective view of a device to obtain "tortellini"

According to the object of the present invention, the apparatus 4 for manufacturing "ravioli" is prepared to replace said device 2 for manufacturing "ravioli" with a device 34 for obtaining "tortellini", which is diagrammatically shown in FIG. 2 and composed by a first means A for forming "tortellini" and a second means B for ejecting them.

The replacing of the device 2 for manufacturing "ravioli" with the device 34 for manufacturing "tortellini" takes place in a simple way, by slipping off the first device 2 and inserting in the same position the device 34, by employing the same bolts 6 by which the first device was fixed to the apparatus 4 for manufacturing "ravioli", and by keeping unchanged both the position of conduit 16 which feeds the stuffing and the centering of the sheet of pastry.

Figure 4:
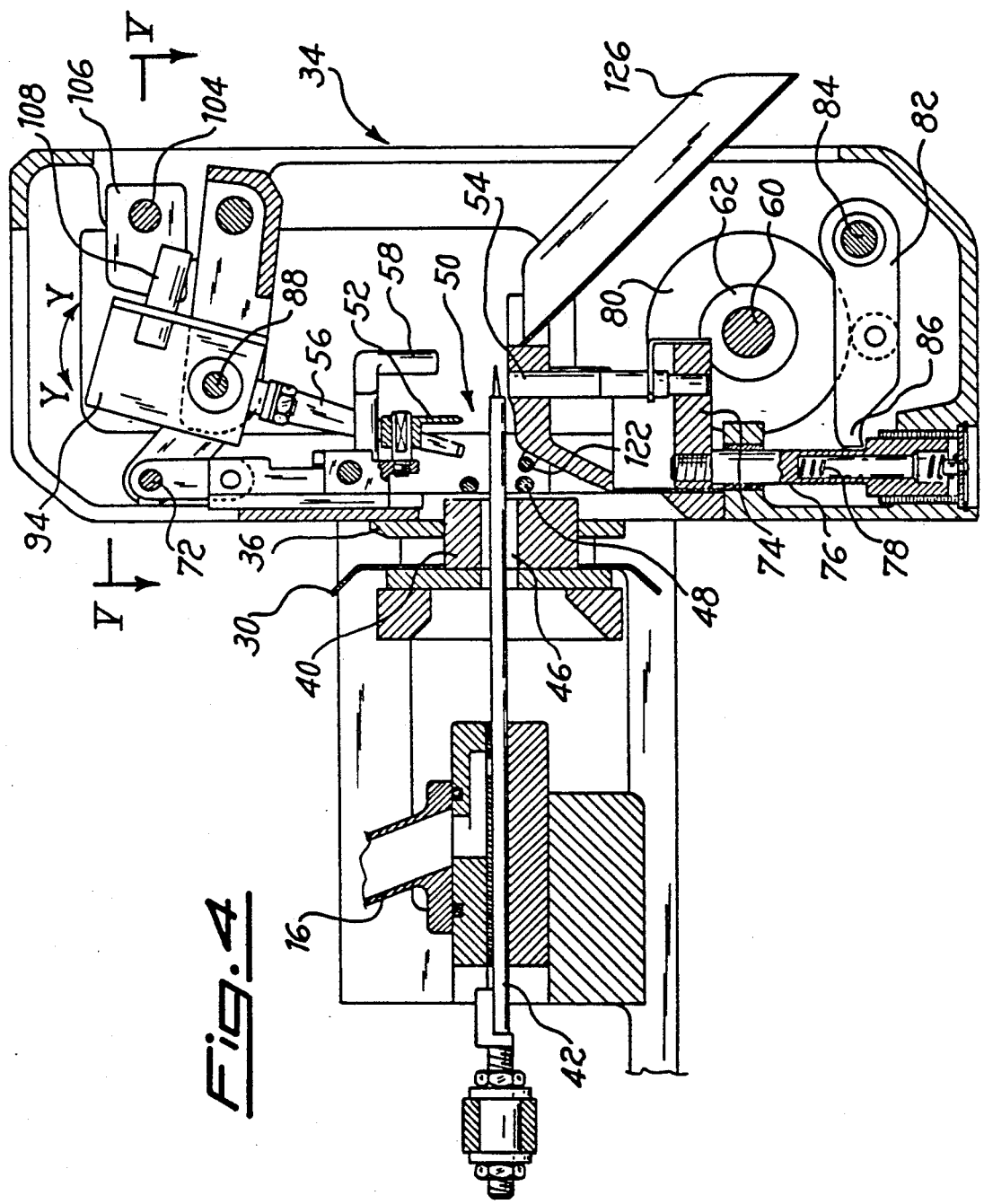
FIG. 4 is a sectional view taken along line IV—IV in FIG. 3.
Figure 5:
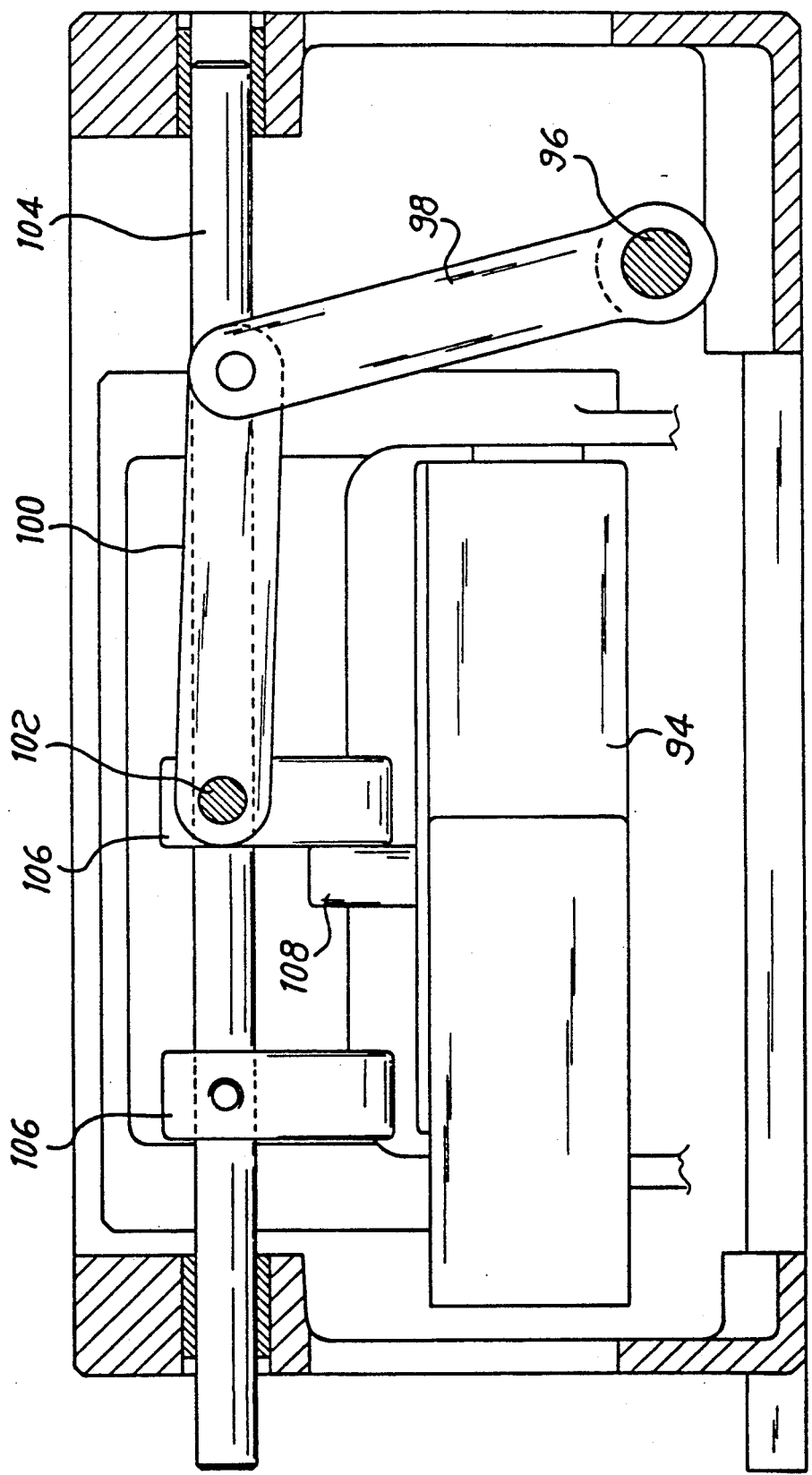
FIG. 5 is a sectional view taken along line V—V in FIG. 4.
Figure 6:
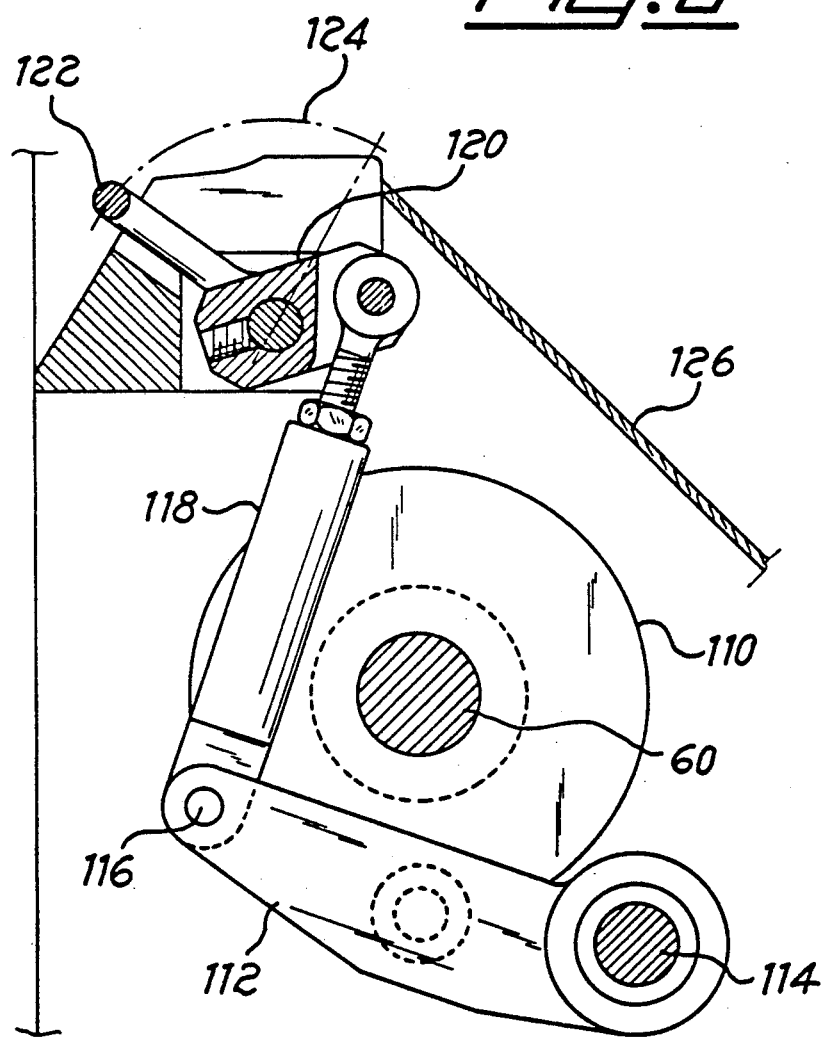
FIG. 6 is an enlarged view of a particular in FIG. 4.

Referring to FIGS. 2 to 5, the device 34 comprises a first means A for forming "tortellini" and a second means B for ejecting them, which is shown in detail in FIG. 6.

The means A comprises the following parts:

a matrix 36 has a heart-shaped opening 38 through which there pass both a punch 40 and a piston 42 which pushes the stuffing 44 and passes through an opening 46 of the punch 40. The stuffing 44 is pushed against the sheet of pastry 10 which is fed along the guide 30 fixed to device 34. The batter P formed of both the stuffing 44 and the sheet of pastry 10, upon being sheared by the punch 40 is C-folded by small rods 48 and is put in the area 50 where a "tortellino" is formed.

In said area 50 a lunette 52 is provided which while descending, embraces the batter P which is C-folded around a central pin 54. Around the central pin 54 the hand-devices 56 cross according to the arrows X and, by rotating on their axes Z,Z', they fold the batter until forming a ring around the central pin 54, and finally a small hammer 58 lowers thus fixing the two overlapped ends P' of the ring-shaped batter, with the final creation of a "tortellino" T.

The above-cited means A for forming a "tortellino" are actuated by the devices hereinafter described and shown in FIGS. 3 to 5.

Said devices are operated by a shaft 60 on which there is keyed a gear 62 operated by a gear 64 which is in turn coupled to a gear 66 operated by the driving shaft of the apparatus for manufacturing "ravioli", with such driving shaft being non-represented in the drawing. Said driving shaft actuates, through a clutch 68, the gear 66 and consequently the shaft 60.

On the latter, rotating cams non-visible in the drawing are mounted, which transmit their motion to rods 70 suitably connected, by a transmission 72, to respectively the lunette 52 and the small hammer 58.

The central pin 54 is fixed to a crossbar 74 connected in turn to a hollow element 76 containing a spring 78 which keeps raised the central pin 54 around which the batter P is wound. The lowering of said central pin 54 is caused by a cam 80 keyed on the driving shaft 60 through a lever 82 pivoted in 84 and having an end 86 which operates the hollow element 76 thus compressing the spring 78 and consequently lowering the pin 54, upon the function thereof is over.

The hand-devices 56, besides rotating on their axes Z,Z', have a Y—Y raising and lowering movement around a pin 88 which takes place as follows: a non-represented cam keyed on the rotating shaft 60, through a transmission also non-represented, transmits to a box 94, through a pin 90 and a curved rod 92, an oscillatory movement around pin 88. As axes Z,Z' are integral with said box 94, during said movement of box 94, the hand-devices 56 oscillate as well in their up and down movement around the pin 88 itself. A vertical shaft 96, which is caused to oscillate by a further non represented cam keyed on the shaft 60, as shown in FIG. 5, carries a lever 98 which shifts, through a transmission 100 pivoted in 102, a shaft 104 on which sliding blocks 106 are fixed. The alternate movement of said blocks 106 transmits a similar motion to a piece 108 which in turn causes hand-devices 56 to oscillate around respectively axes Z,Z' for their movement according to arrows X, thus causing batter P to embrace central pin 54.

In such a way the "tortellino" T is formed and now all the above described components move away, i.e. the pin 54 lowers, the small hammer 58 raises together with lunette 52 and the hand-devices raise as well while rotating around shaft 88. Now the means B, shown in FIGS. 2 and 6, for ejecting the "tortellino", is actuated. This means B comprises the following parts:

a cam 110 keyed on the shaft 60 transmits the oscillatory movement to a lever 112 around a shaft 114. Said lever 112 is pivoted in 116 on a rod 118 and through a transmission 120 causes an ejector 122 to swing along a curved path 124 so that the formed "tortellino" T is pushed by the ejector 122 and thus descends along a chute 126.

Figure 3:
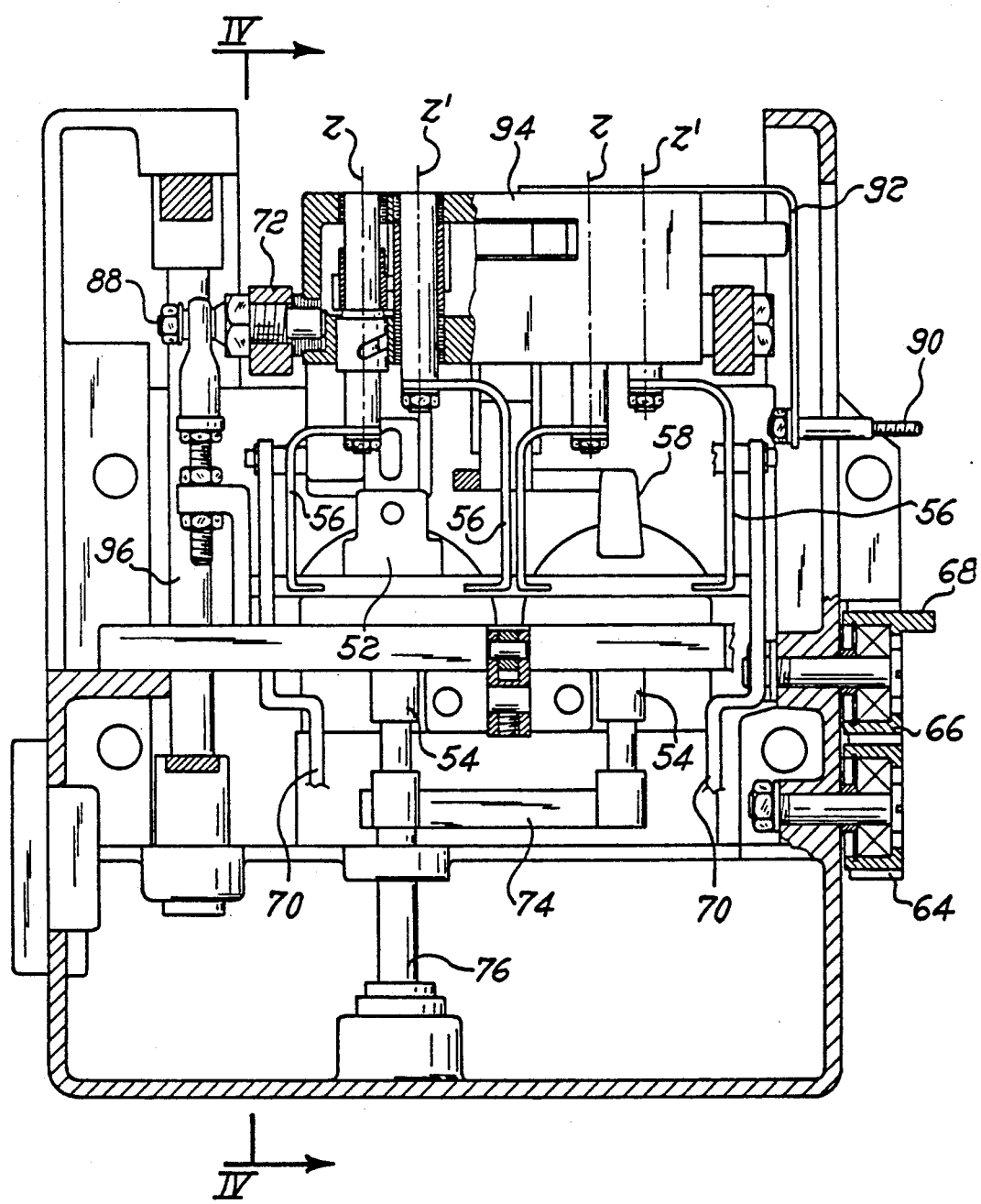
FIG. 3 is a front partially sectional view of the device in FIG. 2.

It should be noticed that in FIG. 2 the device to form a "tortellino" at a time is shown, as well as in FIG. 3 the shown parts relate to the manufacturing of two "tortellini" at a time, but it is clear that the device for producing "tortellini", to be applied to the apparatus for manufacturing "ravioli", can be realized in a way such to produce contemporaneously whatever number of "tortellini" by simply additioning as much forming devices, arranged side by side, identical to those illustrated and described in the present application.

It is clear that the cams keyed on the shaft 60 are timed in such a way that the movements of the described and illustrated components, which constitute the means for forming and ejecting a "tortellino" T, take place in a precise sequence, as described and illustrated particularly in FIG. 2.

Variations and or modifications can be brought to both the device for producing "tortellini" and the way to prepare the replacement of said device for producing "tortellini" with a device for producing "ravioli" and vice-versa, without thereby exceeding the scope of protection of the present invention.

I claim:

1. A device (34) for making tortellini from a single sheet of pastry (10) and stuffing, said device (34) being for attachment to an apparatus (4) which includes a ravioli making device (2), means for providing the single sheet of pastry (10) and a feeding conduit (16) for providing the stuffing, said ravioli making device (2) being replaced by said device (34) for making tortellini, the device (34) comprising means for forming a tortellino and means for ejecting the tortellino from the device (34).

2. A device (34) for making tortellini according to claim 1, wherein the device (34) includes means (6) for positioning the device on the apparatus (4) such that the feeding conduit (16) for providing the stuffing and the sheet of pastry (10) are aligned with the device (34).

3. A device (34) for making tortellini according to claim 1, wherein the forming means comprises: a lunette (52) which lowers around a wound batter formed by the sheet of pastry (10) which wraps the stuffing, a central pin (54) around which the batter is wound by means of two hand-devices (56) rotating around their axes (Z, Z'), a small hammer (58) which closes the ends of the tortellino such that teach tortellino is formed by successively raising the lunette (52), the hand-devices (56) and the smaller hammer (58), and lowering the central pin (54).

4. A device (34) for making tortellini according to claim 1, wherein the ejecting means comprises an oscillating rod (118) which swings an ejector (122) which ejects the tortellino from a forming area (50) thereof.

5. A device (34) for making tortellini according to claim 1, wherein the forming means and the ejecting means are each connected to devices actuated by suitably timed cams which are keyed on a shaft (60) of the device (34) for making tortellini such that the shaft (60) is actuated through a clutch (68) by a driving shaft of the apparatus (4).

6. A device (34) for making tortellini according to claim 2, wherein the forming means and the ejecting means are each connected to devices actuated by suitably timed cams which are keyed on a shaft (60) of the device (34) for making tortellini such that the shaft (60) is actuated through a clutch (68) by a driving shaft of the apparatus (4).

7. A device (34) for making tortellini according to claim 3, wherein the forming means and the ejecting means are each connected to devices actuated by suitably timed cams which are keyed on a shaft (60) of the device (34) for making tortellini such that the shaft (60) is actuated through a clutch (68) by a driving shaft of the apparatus (4).

8. A device (34) for making tortellini according to claim 4, wherein the forming means and the ejecting means are each connected to devices actuated by suitably timed cams which are keyed on a shaft (60) of the device (34) for making tortellini such that the shaft (60) is actuated through a clutch (68) by a driving shaft of the apparatus (4).

* * * * *